US005824278A

United States Patent [19]

Yao

[11] Patent Number: 5,824,278

[45] Date of Patent: Oct. 20, 1998

[54] PROCESS FOR PRODUCING PEROVSKITE TYPE COMPLEX OXIDE PRECIPITATES

[75] Inventor: Takeshi Yao, Katano, Japan

[73] Assignees: Takeshi Yao, Osaka; Hoya Corporation, Tokyo, both of Japan

[21] Appl. No.: 737,132

[22] PCT Filed: Mar. 15, 1996

[86] PCT No.: PCT/JP96/00669

§ 371 Date: Nov. 14, 1996

§ 102(e) Date: Nov. 14, 1996

[87] PCT Pub. No.: WO96/28386

PCT Pub. Date: Sep. 19, 1996

[30] Foreign Application Priority Data

Mar. 15, 1995 [JP] Japan .................................... 7-056346
Sep. 27, 1995 [JP] Japan .................................... 7-249866

[51] Int. Cl.$^6$ ............................ C01F 17/00; C01G 25/02

[52] U.S. Cl. ............................................ 423/263; 423/608

[58] Field of Search ..................................... 423/263, 608

[56] References Cited

U.S. PATENT DOCUMENTS 5,433,531 7/1995 Bosserman ............................. 423/263

FOREIGN PATENT DOCUMENTS 0 641 740 A1 3/1995 European Pat. Off. .
63-25223 2/1988 Japan .
64-83670 3/1989 Japan .
1-192707 8/1989 Japan .

OTHER PUBLICATIONS

Derwent Publications Ltd, AN 87–046179, Shirasaki Shinichi, “Production of easily sintering perovskite raw material powder by powder dispersing” Abstract of JP 62 003 005 A (1987).

Derwent Publications Ltd., AN 93–012008, Dexi Shigeto, Production of thin oxide film, Abstract of JP 04 338 136 A (1992).

*Primary Examiner*—Gary P. Straub
*Attorney, Agent, or Firm*—Frishauf, Holtz, Goodman, Langer & Chick, P.C.

[57] ABSTRACT

This invention relates to a process for producing metal oxide precipitates, which comprises making a fluoride ion-capturing agent exist in a mixed solution of (1) an aqueous solution or hydrofluoric acid solution containing a fluoro complex compound and/or a metal fluoride each having a rare earth metal and/or an alkaline earth metal atom(s) $M^1$; and (2) an aqueous solution or hydrofluoric acid solution containing a metal fluoro complex compound and/or a metal fluoride each having a transition metal and/or a 3B group metal atom(s) $M^2$ to form precipitates comprising a perovskite type complex oxide containing $M^1$ and $M^2$, and is suitable for producing precipitates of a perovskite type complex oxide, particularly precipitates such as a thin film or the like on the surface of a substrate which has a large area or complicated shape, by using a simple apparatus without requirement of a heating step for crystallization.

35 Claims, No Drawings

PROCESS FOR PRODUCING PEROVSKITE TYPE COMPLEX OXIDE PRECIPITATES

TECHNICAL FIELD

This invention relates to a process for producing precipitates of a perovskite type complex oxide, for example, a process for forming a thin film of a perovskite type complex oxide on the surface of a substrate or precipitating said complex oxide in a liquid, more specifically to a process for producing precipitates of said complex oxide from an aqueous solution, for example, a process for forming the precipitates as a thin film on the surface of a substrate.

BACKGROUND ART

Perovskite type complex oxides, particularly rare earth transition metal perovskite, rare earth 3B group metal perovskite and alkaline earth transition metal perovskite type complex oxides are excellent in heat resistance and corrosion resistance and also have high oxide ion conductivities and electronic conductivities, and further, in some of the complex oxides, superconductivity is generated at relatively high temperature so that they have been used as an electrolyte and an electrode of a fuel cell, an oxygen sensor, an oxygen-enrich membrane, a heating element, a dielectric material, a magnetic material, a superconductor, etc. Also, they have oxidation-reduction catalystic ability so that they have been also used as a catalyst. In these uses, in order to make moving distances of electrons and ions smaller to heighten electric conductivity and sensitivity or heighten a gas permeation amount; or in order to obtain a wide surface area or contact area, or in order to save weight, it has been desired to form a thin uniform film or, depending on the use, precipitates existing dispersedly on the surface of a substrate, easily on the surfaces of various substrates.

As a method for forming such an oxide thin film, there may be mentioned methods such as CVD, ion plating, sputtering, etc. However, in these methods, not only a special expensive apparatus is required, but also formation of a thin film having a large area and formation of a thin film on the surface of a substrate having a complicated shape are difficult, in particular, a thin film required for a large fuel cell cannot be obtained easily.

Therefore, it has been attempted that a solution of a compound containing metal elements constituting a perovskite type complex oxide is coated on a substrate, and a thin film of said complex oxide is formed by oxidation. For example, in Japan Ceramics Society, Annual meeting in 1994 (Nagoya), Lecture previous manuscripts 3G04, Oya et al. have formed a perovskite type complex oxide thin film of $Ln(Cr,Mn)O_3$ by using a solution obtained by dissolving the respective 2-ethylhexanoates of rare earth elements, chromium and manganese in isopropanol, as a coating solution, adding diethanolamine thereto and producing a thin film on the surface of a silica glass substrate by dip coating and carrying out heat treatment at 800° C.

However, in such a method, there are problems that there is a limit in formation of precipitates on the surface of a substrate having a large area or a complicated shape, it is necessary to crystallize an oxide coated on a substrate by heating, there is possibility that heat shrinkage and deformation are caused during heating, and some substrates cannot stand such heating.

On the other hand, in Japanese Provisional Patent Publication No. 58635/1993, there has been disclosed a method in which a substrate is soaked in an aqueous solution containing lead ions, hexafluorotitanic acid ions and boric acid ions to form a complex oxide thin film of titanium and lead on the surface of said substrate. Here, as a lead source, lead chloride, lead acetate or lead nitrate is used. A $PbTiO_3$ thin film obtained by this method on the surface of the substrate has a pyrochlore type crystal structure. In order to convert this film into perovskite type $PbTiO_3$, a step of carrying out heat treatment at 300° to 900° C. is further required.

An object of the present invention is to provide a process for producing perovskite type complex oxide precipitates, in which, by using a simple apparatus, precipitates such as a thin film, etc. can be formed on the surface of a substrate having a large area, etc. and also precipitates such as a thin film, etc. can be easily formed on the surface of a substrate having a complicated shape, which cannot be obtained by a conventional method for forming perovskite type complex oxide precipitates, and also a heating step for crystallizing these precipitates is not required.

The present inventors have studied intensively in order to achieve the above object and consequently found that by adding a fluoride ion-capturing agent to aqueous solutions or hydrofluoric acid solutions containing metal fluoro complex compounds and/or metal fluorides of plural metal elements constituting a desired perovskite type complex oxide, precipitates of the perovskite type complex oxide, for example, a thin film can be formed easily on the surface of a substrate, to accomplish the present invention.

DISCLOSURE OF THE INVENTION

That is, the process for producing perovskite type complex oxide precipitates of the present invention comprises making a fluoride ion-capturing agent exist in a mixed solution of (1) an aqueous solution or hydrofluoric acid solution containing a metal fluoro complex compound and/or a metal fluoride each having a rare earth metal and/or an alkaline earth metal atom(s) $M^1$; and (2) an aqueous solution or hydrofluoric acid solution containing a metal fluoro complex compound and/or a metal fluoride each having a transition metal and/or a 3B group metal atom(s) $M^2$ to form precipitates of an perovskite type complex oxide having the metal atoms $M^1$ and $M^2$.

The perovskite type complex oxide in the present invention includes a series of complex oxides which are cubic (including pseudo-cubic) perovskite type, tetragonal (including pseudo-tetragonal) perovskite type, orthorhombic (including pseudo-orthorhombic) perovskite type, hexagonal (including pseudo-hexagonal) perovskite type, trigonal (including rhombohedral) perovskite type, monoclinic perovskite type, triclinic perovskite type and oxygen-deficient perovskite type; and have a crystal structure which is similar thereto.

BEST MODE FOR PRACTICING THE INVENTION

The perovskite type complex oxide precipitates to be formed by the present invention are represented by the formula (I):

$$M^1_x M^2_y O_z \quad \text{(I)}$$

(wherein $M^1$ and M2 are as described above; and x, y and z are each a number satisfying electric neutral) and typically comprise an oxide represented by $M^1M^2O_3$, but it is not limited thereby as illustrated below.

As $M^1$, there may be mentioned a rare earth metal atom such as scandium, yttrium, lanthanum, cerium, praseodymium, neodymium, promethium, samarium, europium, gadolinium, terbium, dysprosium, holmium, erbium, thulium, ytterbium and lutetium; and an alkaline earth metal atom such as beryllium, magnesium, calcium, strontium and barium, and one or two or more of them may exist in the same crystal. Also, as a part of $M^1$, an alkali metal such as lithium, sodium, potassium, rubidium and cesium may be contained.

$M^2$ may be exemplified by a rare earth metal atom such as scandium, yttrium and the above-mentioned lanthanum and cerium series metals; a IVB group metal atom such as titanium, zirconium and hafnium; a VB group metal atom such as vanadium, niobium and tantalum; a VIB group metal atom such as chromium, molybdenum and tungsten; a VIIB group metal atom such as manganese, tecnisium and rhenium; a VIII group metal atom such as iron, cobalt, nickel, ruthenium, rhodium, palladium, osmium, iridium and platinum; a IB group metal atom such as copper, silver and gold; and a IIIA group metal atom such as aluminum, gallium and indium, and one or two or more of them may exist in the same crystal. Also, as a part of $M^2$, an alkaline earth metal such as berylium and magnesium may be contained.

The perovskite type complex oxide may be exemplified by a rare earth metal transition metal type complex oxide such as $YScO_3$, $LaScO_3$, $LaYO_3$, $LaCrO_3$, $LaMnO_3$, $LaMnO_{3.12}$, LaMnO3.15, $LaRhO_3$, $La_2CuO_4$, $La_2Cu_2O_5$, $(La,Sr)MnO_3$, $PrScO_3$, $NdScO_3$, $NdCoO_3$, $NdMnO_3$, $Nd_2CuO_4$, $SmCrO_3$, $SmCoO_3$, $EuCrO_3$, $GdScO_3$, $GdCrO_3$, $GdMnO_3$, $GdCoO_3$, $DyMnO_3$, $La_{0.5}Li_{0.5}TiO_3$, $La_{0.5}Na_{0.5}TiO_3$ and $YBa_2Cu_3O_7$; an alkaline earth metal transition metal type complex oxide such as $CaCrO_3$, $Ca_2Mn_2O_5$, $CaTiO_3$, $CaZrO_3$, $Ca_{0.86}Sr_{0.14}CuO_2$, $SrTiO_3$, $SrZrO_3$, $Sr_3Zr_2O_7$, $Sr_4Zr_3O_{10}$, $Sr_2Mn_2O_5$, $SrCoO_3$, $BaCrO_3$, $BaCoO_3$, $BaTiO_3$ and $BaRuO_3$; and a rare earth metal 3B group metal type complex oxide such as $YAlO_3$, $LaAlO_3$, $LaGaO_3$, $LaGa_{1-x}Mg_xO_{3-y}$, $LaInO_3$, $NdAlO_3$, $NdGaO_3$ and $SmAlO_3$, and a complex oxide in which $M^1$ is a rare earth metal and $M^2$ is manganese, chromium, cobalt or gallium; and a complex oxide in which $M^1$ is an alkaline earth metal and $M^2$ is titanium are particularly preferred since synthesis according to the present invention is easy and availability is high.

As the metal fluoro complex compound to be used as a starting material in the present invention, acids or salts which can be dissolved in water, represented by the formulae (II):

$$A_aM^1_bF_c \qquad (II)$$

and (III)

$$A_dM^2_eF_f \qquad (III)$$

(wherein $M^1$ and $M^2$ are as described above; As may be the same or different from each other and each represent a hydrogen atom, an alkali metal atom, an ammonium group or coordinated water; and a, b and c, and d, e and f are each a number of 1 or more and a number of making said complex compound electrically neutral) are used in combination. As A, there may be mentioned a hydrogen atom; an alkali metal atom such as lithium, sodium, potassium, rubidium and cesium; and an ammonium group. $M^1$ and $M^2$ are metal atoms constituting the desired perovskite type complex oxide, respectively, and depending on the structure of said complex oxide, one or two or more of them may be used, respectively. a and d are each independently a number of 1 or more, and when b and e are 1, they are each a number obtained by subtracting the valence of $M^1$ or $M^2$ from c and f described below. c is a number of 4 or more when $M^1$ is, for example, a trivalent metal such as yttrium. Also, f is a number exceeding the valence of $M^2$.

The rare earth metal fluoro complex compound represented by the formula (II) may be exemplified by a yttrium fluoro complex compound such as $HYF_4$, $H_2YF_5$, $H_3YF_6$, $NaYF_4$, $Na_2YF_5$, $Na_3YF_6$, $Na_4YF_7$, $Na_5YF_8$, $KYF_4$, $K_2YF_5$, $K_3YF_6$, $NH_4YF_4$, $(NH_4)_2YF_5$, $(NH_4)_3YF_6$, $(NH_4)_4YF_7$ and $(NH_4)_5YF_8$; and a scandium fluoro complex compound, a lanthanum fluoro complex compound, etc. corresponding thereto; and with respect to a rare earth metal taking tetravalence such as cerium and a rare earth metal taking divalence such as samarium, compounds corresponding to the respective valences are also used. The alkaline earth metal fluoro complex compound may be exemplified by the similar complex compounds including $H_2CaF_4$.

Also, the metal fluoride of the above metal $M^1$ is preferably soluble in hydrofluoric acid and may be exemplified by an alkaline earth metal fluoride such as berylium fluoride, magnesium fluoride, calcium fluoride, strontium fluoride and barium fluoride; and a rare earth metal fluoride such as gadolinium fluoride. Such fluoro-transition metal complex compounds and metal fluorides may be used singly or in combination of two or more, if necessary. Also, as a part of the metal fluoride, an alkali metal fluoride such as lithium fluoride and sodium fluoride may be used.

As the transition metal fluoro complex compound and fluoro complex compound of the IIIA group metal, represented by the formula (III), there may be used those corresponding to the respective valences of the metals illustrated above. For example, in the case of a chromium fluoro complex compound, it may be exemplified by $H_3CrF_6$, $Na_3CrF_6$, $K_3CrF_6$, $Rb_3CrF_6$, $Cs_3CrF_6$ and $(NH_4)_3CrF_6$, etc. Also, as a part of the fluoro complex compound, an alkaline earth metal fluoro complex compound such as $Na_2MgF_4$ and $K_2MgF_4$ may be used.

The metal fluoride which is soluble in hydrofluoric acid of the above metal $M^2$ may be exemplified by zirconium fluoride, hafnium fluoride, manganese fluoride, cobalt fluoride, copper fluoride, etc. Such transition metal fluoro complex compounds and metal fluoride may be used singly or in combination of two or more, if necessary. Also, as a part of the metal fluoride, an alkaline earth metal fluoride such as beryllium fluoride and magnesium fluoride may be used.

Such a metal fluoro complex compound and a metal fluoride exist in the form of corresponding complex ions and/or ions in the solution.

The metal fluoro complex compound and metal fluoride to be used in the present invention may be one which is prepared by any method, but preferably by treating a complex oxide corresponding to the desired perovskite type complex oxide precipitates, or plural compounds of/metals constituting said complex oxide, with hydrofluoric acid, a corresponding one or two or more metal fluoro complex compounds and/or metal fluorides can be obtained as a hydrofluoric acid solution. For example, when $LaMnO_3$ precipitates are to be formed on the surface of the substrate, $LaMnO_3$ powder obtained from $La_2O_3$ and $MnCO_3$ by heat treatment may be treated with hydrofluoric acid to prepare a metal fluoro complex compound containing La and Mn and/or a corresponding fluoride, or $La_2O_3$ and a manganese compound at a pre-determined amount ratio may be treated with hydrofluoric acid to prepare the similar reaction product system. Also, there may be used a fluoro complex compound containing both of $M^1$ and M2, obtained by treating a perovskite type complex oxide with hydrofluoric acid.

Also, the metal fluoro complex compound may be prepared by dissolving a hydroxide or oxyhydroxide of the above metal in an aqueous solution containing an alkali metal hydrogen difluoride such as ammonium hydrogen difluoride or sodium hydrogen difluoride and reacting these.

The metal fluoro complex compound is used by being prepared as an aqueous solution generally having a concentration of $10^{-9}$ to 10 mol/L, preferably $10^{-6}$ to $10^{-1}$ mol/L as a total amount, which is, however, different depending on the compound. There may be also used an aqueous solution obtained by further adding an excess metal oxide to the prepared aqueous solution containing the metal fluoro complex compound to prepare a high concentration solution or a saturated solution and then removing an undissolved metal oxide by filtration. Or, there may be used a solution obtained by dissolving the metal fluoro complex compound and/or the metal fluoride in hydrofluoric acid generally having a concentration of 0.005 to 50% by weight, preferably 0.01 to 50% by weight to generally have a concentration of $10^{-9}$ to 10 mol/L, preferably $10^{-6}$ to $10^{-1}$ mol/L as a total amount.

Further, in such an aqueous solution of hydrofluoric acid solution containing the metal fluoro complex compound and/or the metal fluoride, seed crystal(s) may exist without any problem. As the seed crystal(s), preferred are precipitates of the desired perovskite type complex oxide, for example, a complex oxide which is the same as a thin film, and one or two or more oxides constituting said complex oxide may be used. The seed crystal(s) may have a chemical composition which is different from that of the desired precipitates if they are of the same or similar crystal system. The seed crystal(s) may be generally as fine as 0.001 to 10 $\mu$m, and an existing amount thereof may be optional, but it may be minute. Due to existence of the seed crystal(s), a precipitation rate can be raised. Further, according to the findings of the present inventor, due to existence of the seed crystal(s), precipitates belonging to the same crystal system as the crystal system of said seed crystal(s) can be formed.

In order to make the seed crystal(s) exist, by a method of suspending powder of an oxide which becomes seed crystal (s) in the above-mentioned aqueous solution or hydrofluoric acid solution containing the metal fluoro complex compound and/or the metal fluoride and using a filter paper or filter through which fine crystallites are passed when the oxide power is removed by means of filtration or the like, etc., fine crystallites may be made to remain in the solution to be used as seed crystals. Or, before a substrate is soaked in the solution, the seed crystal(s) may be previously added and dispersed on the substrate. Further, both of these methods may be used in combination.

In the present invention, by adding or inserting a fluoride ion-capturing agent which forms a stable compound by fluoride ions, into the above-mentioned mixed solution of the aqueous solution or hydrofluoric acid solution containing the metal fluoro complex compound and/or the metal fluoride having $M^1$ and the similar solution having $M^2$, the perovskite type complex oxide having $M^1$ and $M^2$ are precipitated. Such a complex oxide may be precipitated as fine crystals from the mixed solution or may be precipitated in the form of a thin film or the like on the surface of a substrate by soaking the substrate in said mixed solution.

The fluoride ion-capturing agent to be used in the present invention includes homogeneous type which is used by being dissolved in a liquid phase and heterogeneous type which is solid matter. Depending on the purpose, one of them may be used, or both of them may be used in combination without any problem. Said fluoride ion-capturing agent is added or inserted after the mixed solution of Solution (1) and Solution (2) is formed.

The homogeneous type fluoride ion-capturing agent may be exemplified by a boric acid such as orthoboric acid, metaboric acid, etc.; sodium hydroxide, aqueous ammonia, etc. For example, when $LaMnO_3$ is to be precipitated from $H_{m-3}LaF_m$ and $H_{n-3}MnF_n$ (where m and n are each independently an integer of 4 or more) by using orthoboric acid, the equilibrium represented by the formula (V) is shifted in a direction that $F^-$ is consumed so that the equilibrium represented by the formula (IV) is shifted in a direction that $F^-$ is produced, and as a result, precipitates comprising $LaMnO_3$ are precipitated. Such a fluoride ion capturing agent is used generally in the form of an aqueous solution. Addition of said capturing agent may be carried out at one time or intermittently in several divided amounts, or may be carried out continuously at a controlled supplying rate, for example, a constant rate.

$$H_{m-3}LaF_m+H_{n-3}MnF_n+3H_2O \leftrightarrows LaMnO_3+(m+n)H^++(m+n)F^- \quad (IV)$$

$$BO_3^{3-}+4F^-+6H^+ \leftrightarrows BF_4^-+3H_2O \quad (V)$$

The heterogeneous type fluoride ion-capturing agent may be exemplified by a metal such as aluminum, titanium, iron, nickel, magnesium, copper, zinc, etc.; ceramics such as glass; and other inorganic substance such as silicon, calcium oxide, boron oxide, aluminum oxide, silicon dioxide, magnesium oxide, etc. When such solid matter is added or inserted into the solution, $F^-$ in the vicinity of the solid matter is consumed to reduce its concentration, whereby chemical equilibrium is shifted to precipitate the perovskite type complex oxide. When such solid matter is used, depending on the addition or insertion method and the reaction conditions thereof, the precipitates, for example, a thin film of the perovskite type complex oxide can be precipitated on the entire surface of a substrate soaked in the solution, or precipitation thereof can be limited to a selected local portion, i.e., the vicinity where said solid matter exists. Or, by using the homogeneous type and heterogeneous type fluoride ion-capturing agents in combination, the precipitates, for example, a thin film on the surface of a substrate can be thickened partially.

The amount of the homogeneous type fluoride ion-capturing agent may vary depending on the kind and shape of the precipitates, but it is generally $10^{-4}$ to 1,000% based on the amount corresponding to the equivalent amount of fluoride ions in the solution, and when a good thin film is to be formed by precipitation, it is preferably used in the range of $10^{-2}$ to 500%. When a large amount of said fluoride ion capturing agent is added to the system at one time, shifting of equilibrium occurs rapidly so that crystals are produced in the solution to make the liquid turbid, whereby a portion which does not contribute to formation of the complex oxide precipitates on the surface of a substrate effectively may be generated. Therefore, when it is intended to form the precipitates, for example, a thin film on the surface of a substrate, it is preferred to carry out addition of said capturing agent gradually.

As the substrate, there may be used a wide range of substances which carries perovskite type complex oxide precipitates to be formed, for example, a thin film, or for forming a multilayer structure with said precipitates, or for being protected from oxidation or the like by said thin film formed. Such a substance may be exemplified by a metal, ceramics, an organic polymer material, etc.

The time when the substrate is soaked in the solution containing the metal fluoro complex compound and/or the metal fluoride may be before, simultaneously with or after addition of the fluoride ion-capturing agent. However, when a substrate which may be corroded by the system is used, it is necessary to pay attention to the composition of the solution, the reaction conditions and the time of soaking. For example, the hydrofluoric acid solution is used as (1) and/or (2), it is preferred that the substrate is soaked after the fluoride ion-capturing agent is added. In this case, after the substrate is soaked, an additional fluoride ion-capturing agent may be further added. Also, there may be used a substrate which also serves as the heterogeneous type fluoride ion-capturing agent, such as aluminum and glass. The shape of the substrate is optional and is not limited to a plate shape, and one having a complicated shape can be also used.

The reaction temperature can be set optionally in such a range that the system maintains the solution, but it is preferably in the range of 10° to 80° C. The reaction time is also optional, and the reaction time is elongated depending on the amount of the desired precipitates and the thickness in the case of a thin film.

As described above, the perovskite type complex oxide precipitates, for example, a thin film having a thickness of 0.001 to 10 $\mu$m or a film having a thickness which is more than that can be formed on the surface of the substrate. The precipitates thus formed can be obtained as crystallized complex oxide precipitates without a heating step such as heat treatment particularly, but a heating step may be provided depending on the purpose. The state of precipitation on the surface of the substrate may vary depending on the material of the substrate. In the case of plastic, a thin film is easily formed on the surfaces of polyethylene terephthalate (hereinafter referred to as "PET") and polyether sulfone (hereinafter referred to as PES). On the surface of polystyrene, a thin film is not formed under ordinary conditions, and when the heterogeneous type fluoride ion-capturing agent such as a metal and glass exists in the vicinity, a thin film is formed at that portion.

UTILIZABILITY IN INDUSTRY

According to the present invention, by using a simple apparatus, a perovskite type complex oxide can be precipitated. Particularly by precipitating it on the surface of a substrate, a thin film or the like can be easily formed on the surface of a substrate having a large area or the surface of a substrate having a complicated shape, which cannot be obtained by a conventional formation method. A heating step for crystallizing the precipitates thus obtained is not particularly required so that neither distortion nor crack is generated. This fact is particularly advantageous in the case of forming a thin film having a large area or a complicated shape.

Further, according to the process of the present invention, it is possible to obtain precipitates of a perovskite type complex oxide in which the valence of a metal of an oxide used as a starting material is maintained. This fact is particularly advantageous when solid solution perovskite precipitates are to be obtained.

The precipitates of the perovskite type complex oxide obtained by the present invention are useful as an electrolyte and an electrode of a fuel cell, an oxygen sensor, an oxygen-enrich membrane, a heating element, a catalyst, a dielectric material, a magnetic material, a superconductor, etc.

EXAMPLES

In the following, the present invention is explained in more detail by referring to Examples. The present invention is not limited by these Examples.

Example 1

$La_2O_3$ and $MnCO_3$ were weighed so that the molar ratio was accurately La:Mn=1:1 and pulverized in an automatic mortar made of alumina for 5 hours while mixing. After the mixed powder obtained was subjected to press molding, it was heat-treated in the air at 1,400° C. for 5 hours and immediately dropped into water to effect quenching, whereby a $LaMnO_3$ heat-treated material was obtained. Then, said heat-treated material was pulverized to obtain powder. $LaMnO_3$ thus obtained was applied to X-ray diffraction (XRD) to confirm that it was orthorhombic perovskite.

0.5 g of the LaMnO3 powder prepared as described above was added to 150 ml of a 23% HF aqueous solution and dissolved in and reacted with the HF aqueous solution by stirring at 30° C. for 24 hours. The powder of $LaMnO_3$ which remained without dissolution was removed by filtration by using a quantitative filter paper (for chemical analysis) JIS P 3801 No. 5C. This filter paper had a holding particle size of 1 $\mu$m, and those having a particle size which was more than that were separated by filtration to obtain a transparent solution in which the fine crystallites of LaMnO3 having a particle size of less than 1 $\mu$m remaining in the filtrate were dispersed. Each 30 ml of the solution containing the fine crystallites thus obtained was taken in 3 polystyrene containers, polyether sulfone (hereinafter referred to as PES) substrates previously subjected to surface polishing and ultrasonic cleaning in ethanol were soaked, and $2.5\times10^{-3}$ mol (as an aqueous solution), $5.0\times10^{-3}$ mol (as an aqueous solution) or $8.0\times10^{-2}$ mol (as powder) of $H_3BO_3$ was added, respectively. When the mixtures were left to stand at 30° C. for 70 hours, formation of a black thin film was observed on the surfaces of the PES substrates, respectively.

When the substrates were applied to XRD, the XRD patterns gave the peak of orthorhombic perovskite type $LaMnO_3$. Also, the results of a scanning type electron microscope (SEM) and energy dispersion X-ray spectroscopic analysis (EDX) showed that thin films comprising $LaMnO_3$ crystals were formed on the surfaces of the substrates. When the particles on the surfaces were observed by SEM, particles having a particle size of 5 $\mu$m or more existed dispersedly on the entire surfaces of the substrates, and a part of them were adhered mutually to form thin films having a size of about 40 $\mu$m square.

Example 2

$LaMnO_3$ powder obtained by the same method as in Example 1 was used, it was dissolved in and reacted with the HF aqueous solution in the same manner as in Example 1, and the remaining $LaMnO_3$ powder was separated by filtration to obtain a transparent solution in which $LaMnO_3$ fine crystallites were dispersed. Each 30 ml of this solution was taken in 4 polystyrene containers A to D, PES substrates were soaked, as shown in Table 1, nickel mesh was superposed on the substrates in the containers A and B, soda-lime glass was superposed on the substrates in the containers C and D, and in the containers B and D, in addition thereto, $8.0\times10^{-2}$ mol of $H_3BO_3$ powder was added. When the respective solutions were left to stand at 30° C. for 70 hours, in all of the cases, formation of a $LaMnO_3$ thin film was observed on the surfaces of the substrates. When application to XRD was carried out, all of the thin films were orthorhombic perovskite $LaMnO_3$.

TABLE 1

| Experiment | Superposed material | $H_3BO_3$ (mol) |
|---|---|---|
| A | Nickel mesh | — |
| B | " | $8.0 \times 10^{-2}$ |
| C | Soda-lime glass | — |
| D | " | $8.0 \times 10^{-2}$ |

As a result of observation by SEM, in both of the cases using nickel mesh or soda-lime glass, the thin films on the substrates of B and D in which $H_3BO_3$ was used in combination were thicker than those on the substrates of A and C in which $H_3BO_3$ was not used, respectively, and had a thickness reaching to about 0.3 μm. Also, both of the thin films on the substrates of B and D were thicker than that of Example 1 in which the amount of $H_3BO_3$ added was $8.0\times10^{-2}$ mol. In the cases of C and D, a large amount of $LaMnO_3$ was precipitated particularly at the interface of the glasses and the substrates, and on the other hand, corrosion of the glasses was observed. From this fact, it can be concluded that the components of the glasses were dissolved by hydrofluoric acid and acted as a fluoride ion-capturing agent.

Example 3

3.0 g of the powder of a $LaMnO_3$ heat-treated material obtained in the same manner as in Example 1 was added to 150 ml of a 27.6% HF aqueous solution and dissolved and reacted by stirring at 30° C. for 24 hours. The powder which remained without dissolution was separated by filtration in the same manner as in Example 1, and each 25 ml of a transparent filtrate in which the fine crystallites of $LaMnO_3$ were dispersed was taken in 3 polystyrene containers.

Separately, 3.056 g of Sr(OH2)·$8H_2O$ was added to 100 ml of a 0.46% HF aqueous solution, and $SrF_2$ was produced by a neutralization reaction. 5 ml, 10 ml or 15 ml of this supernatant was added to the filtrate previously obtained from $LaMnO_3$, respectively, PES substrates were soaked, respectively, and the mixtures were left to stand at 30° C. for 70 hours. In all of the cases, change of color caused by formation of a thin film was observed on the surfaces of the substrates, and as a result of analysis and observation by XRD, SEM and EDX, it was confirmed that the thin films formed comprised orthorhombic perovskite $La_{1-x}SrxMnO_3$ crystals.

Example 4

$La_2O_3$ and $CoCO_3$ were weighed so that the molar ratio was accurately La:Co=1:1 and pulverized in an automatic mortar made of alumina for 5 hours while mixing. After the mixed powder obtained was subjected to press molding, it was heat-treated in the air at 1,400° C. for 5 hours and immediately dropped into water to effect quenching, whereby a $LaCoO_3$ heat-treated material was obtained. The heat-treated material was applied to XRD to confirm that it was rhombohedral perovskite. Then, said heat-treated material was pulverized to obtain powder.

1.0 g of the $LaCoO_3$ powder prepared as described above was added to 200 ml of a 23% HF aqueous solution and dissolved and reacted by stirring at 30° C. for 24 hours. The $LaBO_3$ powder which remained without dissolution was removed by filtration in the same manner as in Example 1. 30 ml of a transparent solution in which $LaCoO_3$ fine crystallites were dispersed thus obtained was taken in a polystyrene container, a PES substrate was soaked, and $8.1\times10^{-2}$ mol of $H_3BO_3$ powder was added. When the mixture was left to stand at 30° C. for 70 hours, change of color caused by formation of a thin film was observed on the surface of the substrate. By XRD and SEM, it was confirmed that the thin film obtained comprised rhombohedral perovskite $LaCoO_3$ crystals having an average particle size of 7 μm.

Example 5

$La_2O_3$ and $Cr_2O_3$ were weighed so that the molar ratio was accurately La:Cr=1:1, and subsequent procedures were carried out in the same manner as in Example 4 to obtain the powder of a rhombohedral perovskite $LaCrO_3$ heat-treated material. In the same manner as in Example 4, the powder thus obtained was dissolved in and reacted with the HF aqueous solution, and filtration was carried out to obtain a transparent solution in which $LaCrO_3$ fine crystallites were dispersed. 30 ml of this solution was taken in a polystyrene container, a PES substrate was soaked, and $8.1\times10^{-2}$ mol of $H_3BO_3$ powder was added. When the mixture was left to stand at 30° C. for 70 hours, change of color caused by precipitates was observed on the surface of the substrate. By XRD and SEM, it was confirmed that particles with a particle size of 5 μm or more comprising rhombohedral perovskite $LaCrO_3$ crystals existed dispersedly on the entire surface of the substrate, and a part of them were adhered mutually to form a thin film having a size of about 30 μm square.

Example 6

$Nd_2O_3$ and $MnCO_3$ were weighed so that the molar ratio was accurately Nd:Mn=1:1, and subsequent procedures were carried out in the same manner as in Example 4 to obtain the powder of a orthorhombic perovskite $NdMnO_3$ heat-treated material. 1.0 g of the powder thus obtained was added to 300 ml of a 23% HF aqueous solution and dissolved and reacted by stirring at 30° C. for 24 hours. The $NdMnO_3$ powder which remained without dissolution was removed by filtration in the same manner as in Example 1. 30 ml of a transparent solution in which $NdMnO_3$ fine crystallites were dispersed thus obtained was taken in a polystyrene container, a PES substrate was soaked, and $8.0\times10^{-2}$ mol of $H_3BO_3$ powder was added. When the mixture was left to stand at 30° C. for 70 hours, change of color caused by precipitates was observed on the surface of the substrate. By XRD, it was confirmed that the precipitates obtained comprised orthorhombic perovskite $NdMnO_3$ crystals. Also, by SEM and EDX, it was confirmed that the average particle size of the precipitates was 7 μm, and Nd and Mn existed in the precipitates.

Example 7

$La_2O_3$ and $MnCO_3$ were weighed so that the molar ratio was accurately La:Mn=1:1 and pulverized in an automatic mortar made of alumina for 5 hours while mixing. After the mixed powder obtained was subjected to press molding, it was heat-treated in the air at 1,400° C. for 5 hours and left to stand for cooling in a furnace, whereby a $LaMnO_3$ heat-treated material P was obtained. This material was pulverized to obtain powder P. When the crystal structure of the powder P thus obtained was measured by XRD, it was rhombohedral crystals showing the index hkl of a hexagonal lattice, X-ray diffraction position and spacing shown in Table 2.

Separately, heat treatment was carried out by using the same formulation ratio under the same conditions, and immediately after heat treatment, a heat-treated material was dropped into water to effect quenching, whereby a $LaMnO_3$ heat-treated material was obtained. This material was pulverized to obtain powder Q. When it was also applied to XRD, it was orthorhombic crystals showing the index hkl, X-ray diffraction position and spacing shown in Table 3.

1.0 of the powder P prepared as described above was added to 300 ml of a 23% HF aqueous solution and dissolved in and reacted with the HF aqueous solution by stirring at 30° C. for 24 hours. The powder P which remained without dissolution was removed by filtration using a membrane filter having a pore size of 0.1 μm. Each 30 ml of a transparent solution thus obtained was taken in 2 polystyrene containers. As seed crystals, 0.01 mg of fine powder obtained by further pulverizing P was added to one polystyrene container and dispersed, and Q was added to the other and dispersed, respectively. Then, PES substrates were soaked, and $8.0\times10^{-2}$ mol of $H_3BO_3$ powder was added, respectively. When the mixtures were left to stand at 30° C. for 70 hours, formation of a black thin film was observed on both of the surfaces of the PES substrates.

When substrates P' and Q' on which a thin film was formed by using the seed crystals P or Q, respectively, were applied to XRD, each XRD pattern was sufficiently coincident with that of P or Q which was used as seed crystals as shown in Tables 2 and 3, and corresponding to the crystal structure of the seed crystals, formation of a rhombohedral or orthorhombic perovskite $LaMnO_3$ thin film was observed.

TABLE 2

| | | | Seed crystals P | | Thin film on surface of substrate P' | |
|---|---|---|---|---|---|---|
| h | k | l | 2Θ | d (Å) | 2Θ | d (Å) |
| 0 | 1 | 2 | 22.8 | 3.90 | 22.8 | 3.90 |
| 1 | 1 | 0 | 32.3 | 2.77 | 32.3 | 2.77 |
| 1 | 0 | 4 | 32.7 | 2.74 | 32.7 | 2.74 |
| 2 | 0 | 2 | 39.9 | 2.26 | 39.9 | 2.26 |
| 0 | 2 | 4 | 46.6 | 1.95 | 46.6 | 1.95 |
| 0 | 1 | 8 | 58.5 | 1.58 | 58.5 | 1.58 |

TABLE 3

| | | | Seed crystals Q | | Thin film on surface of substrate Q' | |
|---|---|---|---|---|---|---|
| h | k | l | 2Θ | d (Å) | 2Θ | d (Å) |
| 1 | 1 | 1 | 25.2 | 3.53 | 25.4 | 3.50 |
| 2 | 0 | 0 | 31.5 | 2.84 | 31.7 | 2.82 |
| 1 | 1 | 2 | 32.4 | 2.76 | 32.4 | 2.76 |
| 2 | 0 | 2 | 39.4 | 2.29 | 39.5 | 2.28 |
| 0 | 2 | 2 | 40.1 | 2.25 | 40.2 | 2.24 |
| 2 | 2 | 0 | 45.7 | 1.98 | 45.8 | 1.98 |
| 0 | 0 | 4 | 47.1 | 1.93 | 47.3 | 1.92 |

Example 8

$La_2O_3$ $Ga_2O_3$ were weighed so that the molar ratio was accurately La:Ga=1:1, and subsequent procedures were carried out in the same manner as in Example 1 to obtain the powder of a heat-treated material. This powder was applied to XRD to confirm that said powder was orthorhombic perovskite $LaGaO_3$. The powder thus obtained was added to 300 ml of a 23% HF aqueous solution and dissolved and reacted by stirring at 30° C. for 24 hours to obtain a solution. The remaining powder was removed by filtration in the same manner as in Example 1 to obtain a transparent filtrate in which $LaGaO_3$ fine crystallites were dispersed. 30 ml of the filtrate was taken in a polystyrene container, a PES substrate was soaked, and $8.0\times10^{-2}$ mol of $H_3BO_3$ powder was added. When the mixture was left to stand at 30° C. for 7 days, change of color caused by precipitates was observed on the surface of the substrate. By XRD, SEM and EDX, it was confirmed that the precipitates comprised orthorhombic perovskite $LaGaO_3$ crystals having an average particle size of 7 μm.

Example 9

$TiO_2$ and $SrCO_3$ were weighed so that the molar ratio was accurately Ti:Sr=1:1, and subsequent procedures were carried out in the same manner as in Example 1 to obtain the powder of a heat-treated material. This powder was applied to XRD to confirm that said powder was cubic perovskite $SrTiO_3$. The powder thus obtained was added to 300 ml of a 23% HF aqueous solution and dissolved and reacted by stirring at 30° C. for 24 hours to obtain a solution. The remaining powder was removed by filtration in the same manner as in Example 1 to obtain a transparent filtrate in which $SrTiO_3$ fine crystallites were dispersed. 30 ml of the filtrate was taken in a polystyrene container, a PES substrate was soaked, and $8.0\times10^{-2}$ mol of $H_3BO_3$ powder was added. After the mixture was left to stand at 30° C. for 7 days, it was confirmed-by XRD, SEM and EDX that cubic perovskite $SrTiO_3$ crystals were precipitated on the surface of the substrate.

Example 10

It was confirmed that from $TiO_2$ and $BaCO_3$, the precipitates of tetragonal perovskite $BaTiO_3$ crystals were obtained on the surface of a PES substrate by the similar method as in Example 9.

Example 11

In the same manner as in Example 1, the powder of a orthorhombic $LaMnO_3$ heat-treated material was obtained by the solid phase method. 0.5 g of the above $LaMnO_3$ heat-treated material powder was added to 150 ml of a 23% HF aqueous solution, and the mixture was stirred at 30° C. for 24 hours. A considerable amount of the powder remained without dissolution. In the same manner as in Example 1, the powder was removed by filtration, and each 30 ml of a transparent filtrate in which $LaMnO_3$ fine crystallites were dispersed was taken in 4 polystyrene containers. Without soaking a substrate, $2.5\times10^{-3}$ mol, $5.0\times10^{-3}$ mol or $8.0\times10^{-2}$ mol of $H_3BO_3$ as an aqueous solution was added thereto, respectively, $H_3BO_3$ was not added to the remaining one, and the solutions were left to stand at 30° C. for 70 hours. From all of the solutions to which $H_3BO_3$ was added, formation of black precipitates was observed, and the solution to which $H_3BO_3$ was not added was not changed at all. When XRD of the precipitates was measured, the peak of orthorhombic $LaMnO_3$ was observed to confirm that said black precipitates were orthorhombic perovskite $LaMnO_3$.

Example 12

Lanthanum oxide, strontium carbonate and manganese carbonate were weighed so that the molar ratio was accurately La:Sr:Mn=0.8:0.2:1.0 and pulverized in an automatic mortar made of alumina for 5 hours while mixing. After the mixture obtained was subjected to press molding, it was heat-treated in the air at 1,400° C. for 5 hours and immediately dropped into water to effect quenching. After the sample was pulverized, XRD was measured to confirm that rhombohedral lanthanum manganese oxide in which strontium was dissolved in the state of a solid solution was produced.

0.5 g of the above-mentioned lanthanum manganese oxide in which strontium was dissolved in the state of a solid solution obtained by the solid phase method was added to 200 ml of a 23% HF aqueous solution and dissolved and reacted by stirring at 30° C. for 24 hours to obtain a solution. After the solid which remained without dissolution was removed by filtration in the same manner as in Example 1, 30 ml of a transparent filtrate in which the fine crystallites were dispersed was taken in a polystyrene container. After a polyethylene terephthalate substrate was soaked, $8.0\times10^{-2}$ mol of $H_3BO_3$ was added, and the mixture was left to stand at 30° C. for 3 days.

When the surface of the substrate was measured by XRD, the similar peak as that of lanthanum manganese oxide in which strontium was dissolved in the state of a solid solution obtained by the solid phase method was observed. When elemental analysis of particles produced on the surface of the substrate was carried out by SEM and EDX, existences of La, Sr and Mn were confirmed. From this fact, it was confirmed that the crystals produced on the surface of the substrate was rhombohedral perovskite lanthanum manganese oxide in which strontium was dissolved in the state of a solid solution.

I claim:

1. A process for producing perovskite structure complex oxide precipitates represented by the formula (I):

$$M^1_xM^2_yO_z \qquad (I)$$

wherein $M^1$ represents at least one metal selected from the group consisting of a rare earth metal and an alkaline earth metal atom optionally along with an alkali metal atom, $M^2$ represents at least one metal selected from the group consisting of a transitional metal and a IIA group metal atom of the periodic table optionally along with an alkaline earth metal atom, x, y and z are each a number making said oxide electrically neutral, which process comprises:

(a) forming an aqueous solution or hydrofluoric acid solution containing (1) at least one compound selected from the group consisting of (i) metal fluoro complex compounds represented by the formula (II):

$$A_aM^1_bF_c \qquad (II)$$

wherein A represents a hydrogen atom, an alkali metal atom, an ammonium group or coordinated water; $M^1$ has the same meaning as defined above; a, b and c are each a number of 1 or more; when b is 1, a is a number obtained by subtracting the valence of $M^1$ from c, and when a is two or more, the A's are the same or different from each other and when b is two or more, the M's are the same or different from each other; and (ii) a metal fluoride which excludes the metal fluoro complex compound of formula (II) and is at least one metal fluoride selected from the group consisting of beryllium fluoride, magnesium fluoride, calcium fluoride, strontium fluoride, barium fluoride and rare earth metal fluorides optionally along with an alkali metal fluoride; and (2) at least one compound selected from the group consisting of (i) metal fluoro complex compounds represented by the formula (III):

$$A_dM^2_eF_f \qquad (III)$$

wherein A and $M^2$ have the same meanings as defined above, d, e and f are each a number of 1 or more; when e is 1, d is a number obtained by subtracting the valence of $M^2$ from f, when d is two or more the A's are the same or different from each other and when e is two or more, the $M^2$'s are the same or different from each other, and (ii) a metal fluoride selected from the group consisting of transition metal fluorides and fluorides of group IIIA metals of the periodic table, optionally along with an alkaline earth metal fluoride selected from the group consisting of beryllium fluoride, magnesium fluoride, calcium fluoride, strontium fluoride and barium fluoride, and (b) adding at least one of a fluoride ion-capturing agent selected from the group consisting of boric acid, borates, sodium hydroxide, aqueous ammonia, aluminum, titanium, iron, nickel, magnesium, copper, zinc, glass, silicon, calcium oxide, boron oxide, aluminum oxide, silicon dioxide, magnesium oxide in a homogeneous state or heterogeneous state to the resulting mixed solution in an amount sufficient to cause precipitation of the perovskite structure complex oxide to form said complex oxide precipitates having the metal atoms $M^1$ and $M^2$.

2. The process according to claim 1, wherein a substrate is soaked in the above solution to form said precipitates on the surface of the substrate.

3. The process according to claim 2, wherein said precipitates are a thin film.

4. The process according to claim 1, wherein at least one compound selected from the group consisting of said metal fluoro complex compounds of formula II and III and said metal fluorides of (a) (1) (ii) and (a)(2)(ii) is produced by reacting at least one of perovskite structure complex oxides or oxides of $M^1$ or oxides of $M^2$, with hydrofluoric acid in a hydrofluoric acid solution.

5. The process according to claim 4, wherein said perovskite type complex oxide is at least one selected from the group consisting of a rare earth metal transition metal complex oxide; an alkaline earth metal transition metal complex oxide; and a rare earth metal IIIA group metal complex oxide.

6. The process according to claim 4, wherein said perovskite type complex oxide is at least one selected from the group consisting of a complex oxide in which $M^1$ is a rare earth metal and $M^2$ is manganese, chromium, cobalt or gallium; and a complex oxide in which $M^1$ is an alkaline earth metal and $M^2$ is titanium.

7. The process according to claim 1, wherein seed crystal (s) is/are present in said solution.

8. The process according to claim 7, wherein the seed crystal(s) is/are formed by reacting an oxide in a hydrofluoric acid solution and then allowing fine crystallites to remain in the solution.

9. The process according to claim 1, wherein $M^1$ is a rare earth metal, and $M^2$ is manganese, cobalt, chromium or gallium.

10. The process according to claim 1, wherein $M^1$ is an alkaline earth metal, and M2 is titanium.

11. The process according to claim 1, wherein the fluoride ion-capturing agent is boric acid.

12. The process according to claim 1, wherein said perovskite structure complex oxide precipitate is $LaCrO_3$, $LaMnO_3$, $LaFeO_3$, $LaCoO_3$ or $NdMnO_3$.

13. The process according to claim 1, wherein said perovskite structure complex oxide precipitate is a (La,sr) $MnO_3$ solid solution.

14. The process according to claim 1, wherein said perovskite structure complex oxide precipitate is $LaGaO_3$.

15. The process according to claim 1, wherein said perovskite structure complex oxide precipitate is $SrTiO_3$.

16. The process according to claim 1, wherein said perovskite structure complex oxide precipitate is $La_2CuO_4$.

17. The process according to claim 1, wherein said perovskite structure complex oxide precipitate is $BaTiO_3$.

18. The process according to claim 1, wherein said metal fluoro complex compound represented by the formula (II) is at least one selected from the group consisting of a yttrium fluoro complex compound, a scandium fluoro complex compound and a lanthanum fluoro complex compound.

19. The process according to claim 1, wherein said metal fluoride of step a(l) is at least one selected from the group consisting of calcium fluoride, strontium fluoride and barium fluoride.

20. The process according to claim 1, wherein said metal fluoro complex compound represented by the formula (III) is a chromium fluoro complex compound.

21. The process according to claim 1, wherein said alkaline earth metal of $M^2$ is beryllium or magnesium.

22. The process according to claim 1, wherein said metal fluoride in step (a)(2)(ii) is at least one selected from the group consisting of zirconium fluoride, hafnium fluoride, manganese fluoride, cobalt fluoride and copper fluoride.

23. The process according to claim 1, wherein the metal fluoride in step (a)(2)(ii) comprises an alkaline earth metal fluoride.

24. The process according to claim 23, wherein said alkaline earth metal fluoride is beryllium fluoride or magnesium fluoride.

25. The process according to claim 1, wherein said fluoride ion-capturing agent is boron oxide.

26. The process according to claim 1, wherein said fluoride ion-capturing agent is aluminum or nickel.

27. The process according to claim 1, wherein said fluoride ion-capturing agent is glass.

28. The process according to claim 1, wherein said fluoride ion-capturing agent is silicon dioxide.

29. The process according to claim 1, wherein said fluoride ion-capturing agent is metaboric acid.

30. The process according to claim 1, wherein said fluoride ion-capturing agent is titanium, magnesium, iron, zinc, calcium oxide or magnesium oxide.

31. The process according to claim 1, wherein the compounds contained in the solution of the step a are the metal fluoro complex compound represented by the formula (II) and the metal fluoro complex compound represented by the formula (III).

32. The process according to claim 1, wherein said perovskite structure complex oxide is at least one selected from the group consisting of $YSCO_3$, $LaScO_3$, $LaYO_3$, $LaCrO_3$, $LaMnO_3$, $LaMnO_{3.12}$, $LaMnO_{3.15}$, $LaRhO_3$, $La_2CuO_4$, $La_2Cu_2O_5$, $(La,Sr)MnO_3$, $PrScO_3$, $NdScO_3$, $NdCoO_3$, $NdMnO_3$, $Nd_2CuO_4$, $SmCrO_3$, $SmCoO_3$, $EuCrO_3$, $GdScO_3$, $GdCrO_3$, $GdMnO_3$, $GdCoO_3$, $DyMnO_3$, $La_{0.5}Li_{0.5}TiO_3$, $La_{0.5}Na_{0.5}TiO_3$, $YBa_2Cu_{3O7}$, $CaCrO_3$, $Ca_2Mn_2O_5$, $CaTiO_3$, $CaZrO_3$, $Ca_{0.66}Sr_{0.14}CuO_2$, $SrTiO_3SrZrO_3$, $Sr_3Zr_2O_7$, $Sr_4Zr_3O_{10}$, $Sr_2Mn_2O_5$, $SrCoO_3$, $BaCrO_3$, $BaCoO_3$, $BaTiO_3$, $BaRuO_3$, $YAlO_3$, $LaAlO_3$, $LaGaO_3$, $LaInO_3$, $NdAlO_3$, $NdGaO_3$ and $SmAlO_3$.

33. The process according to claim 1, wherein said perovskite structure complex oxide is lanthanum manganese oxide.

34. The process according to claim 1, wherein said perovskite structure complex oxide is lanthanum manganese oxide in which strontium is dissolved in the state of a solid solution.

35. The process according to claim 1, wherein the perovskite structure is at least one selected from the group consisting of cubic perovskite structure, tetragonal perovskite structure, orthorhombic perovskite structure, hexagonal perovskite structure, trigonal perovskite structure, rhodohedral perovskite structure, monoclinic perovskite structure, triclinic perovskite structure and oxygen deficient perovskite structure.

* * * * *